United States Patent
Lataste et al.

(10) Patent No.: US 12,537,863 B2
(45) Date of Patent: Jan. 27, 2026

(54) CONFIGURATION OF A TERMINAL

(71) Applicant: ORANGE, Issy-les-Moulineaux (FR)

(72) Inventors: Sandrine Lataste, Chatillon (FR);
Steve Tsang Kwong U, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/558,630

(22) PCT Filed: Apr. 27, 2022

(86) PCT No.: PCT/FR2022/050803
§ 371 (c)(1),
(2) Date: Nov. 2, 2023

(87) PCT Pub. No.: WO2022/234218
PCT Pub. Date: Nov. 10, 2022

(65) Prior Publication Data
US 2024/0250999 A1   Jul. 25, 2024

(30) Foreign Application Priority Data
May 3, 2021   (FR) ...................... 2104649

(51) Int. Cl.
*H04L 12/24* (2006.01)
*H04L 41/0803* (2022.01)
(Continued)

(52) U.S. Cl.
CPC ...... *H04L 65/1069* (2013.01); *H04L 65/1073* (2013.01); *H04W 48/18* (2013.01)

(58) Field of Classification Search
CPC ........... H04L 65/1069; H04L 65/1073; H04W 48/18; H04W 24/02
(Continued)

(56) References Cited

U.S. PATENT DOCUMENTS

2014/0281661 A1* 9/2014 Milton .................. G06F 11/073
                                                                 714/2
2016/0238435 A1* 8/2016 Mcphail .................. G01G 23/01
(Continued)

FOREIGN PATENT DOCUMENTS

WO    2018069852 A1    4/2018
WO    2020146211 A1    7/2020

OTHER PUBLICATIONS

English translation of the Written Opinion of the International Searching Authority dated Jul. 22, 2022 for corresponding International Application No. PCT/FR2022/050803, filed Apr. 27, 2022.
(Continued)

*Primary Examiner* — Ario Etienne
*Assistant Examiner* — Elizabeth Kassa
(74) *Attorney, Agent, or Firm* — David D. Brush; Westman, Champlin & Koehler, P.A.

(57) ABSTRACT

A method for parameterizing a terminal device, able to transmit and receive data on a communications network organized into network slices. The method is implemented by a network administration entity able to communicate with the terminal device via the network. The method includes: following receipt of a registration request or a data session establishment request from the terminal device, obtaining at least one slice identifier associated with said terminal device, determining a maximum number of slices accessible to said terminal device, and if the determined maximum number of slices is lower than the number of identifiers obtained, transmitting a response message to said received request to the terminal device. The response message indicates rejection of the request and/or a list of identifiers from among the obtained slice identifiers.

14 Claims, 5 Drawing Sheets

(51) Int. Cl.
*H04L 65/1069* (2022.01)
*H04L 65/1073* (2022.01)
*H04W 48/18* (2009.01)

(58) Field of Classification Search
USPC .......................................................... 709/228
See application file for complete search history.

(56) References Cited

U.S. PATENT DOCUMENTS

| | | | |
|---|---|---|---|
| 2020/0053643 A1* | 2/2020 | Lee ...................... | H04W 48/10 |
| 2020/0322879 A1* | 10/2020 | Zhu ...................... | H04W 60/00 |
| 2020/0367109 A1* | 11/2020 | Chen ...................... | H04W 28/18 |
| 2020/0413241 A1* | 12/2020 | Park ...................... | H04W 76/22 |
| 2021/0136715 A1* | 5/2021 | Jeong .................... | H04W 60/00 |
| 2021/0144790 A1* | 5/2021 | Faccin .................. | H04W 76/18 |
| 2021/0226838 A1* | 7/2021 | Hegarty ................ | H04M 15/66 |
| 2022/0159605 A1* | 5/2022 | Li .......................... | H04W 76/10 |
| 2022/0377655 A1* | 11/2022 | Keller .................. | H04W 60/00 |
| 2025/0081086 A1* | 3/2025 | Shen ...................... | H04W 24/00 |
| 2025/0203500 A1* | 6/2025 | Starsinic .............. | H04W 60/00 |

OTHER PUBLICATIONS

"3rd Generation Partnership Project; Technical Specification Group Services and System Aspects; System architecture for the 5G System (5GS); Stage 2 (Release 17)", vol. SA WG2, No. V17.0.0, Mar. 30, 2021 (Mar. 30, 2021), p. 1-489, 3GPP Standard; 3GPP TS 23.501, 3RD Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/Specs/archive/23_series/23.501/23501-h00.zip 23501-h00.docx.

"3rd Generation Partnership Project; Technical Specification Group Services and System Aspects; Procedures for the 5G System (5GS); Stage 2 (Release 17)", Technical Specification, 3GPP TS 23.502 V17.0.0 (Mar. 2021).

"3rd Generation Partnership Project; Technical Specification Group Core Network and Terminals; Non-Access-Stratum (NAS) protocol for 5G System (5GS); Stage 3; (Release 17)", Technical Specification, 3GPP TS 24.501 V17.2.1 (Apr. 2021).

"3rd Generation Partnership Project; Technical Specification Group Core Network and Terminals; 5G System; Unified Data Management Services; Stage 3 (Release 17)", Technical Specification, 3GPP TS 29.503 V17.0.0 (Sep. 2020).

International Search Report dated Jul. 22, 2022 for corresponding International Application No. PCT/FR2022/050803, filed Apr. 27, 2022.

Written Opinion of the International Searching Authority dated Jul. 22, 2022 for corresponding International Application No. PCT/FR2022/050803, filed Apr. 27, 2022.

International Search Report dated Jul. 22, 2022 for corresponding International Application No. PCT/FR2022/050803, filed Apr. 27, 2023.

Written Opinion of the International Searching Authority dated Jul. 22, 2022 for corresponding International Application No. PCT/FR2022/050803, filed Apr. 27, 2023.

"3rd Generation Partnership Project; Technical Specification Group Services and System Aspects; System architecture for the 5G System (5GS); Stage 2 (Release 17)", vol. SA WG2, No. V17.0.0, Mar. 30, 2021, p. 1-489, 3GPP Standard; 3GPP TS 23.501, 3GPP, Mobile Competence Centre ; 650, Route Des Lucioles ; F-06921 Sophia-Antipolis Cedex, France.

* cited by examiner

CONFIGURATION OF A TERMINAL

CROSS-REFERENCE TO RELATED APPLICATIONS

This Application is a Section 371 National Stage Application of International Application No. PCT/FR2022/050803, filed Apr. 27, 2022, which is incorporated by reference in its entirety and published as WO 2022/234218 A1 on Nov. 10, 2022, not in English.

1. TECHNICAL FIELD

The invention lies in communications networks, and in particular in networks in which network slices are instantiated, making it possible to dedicate communications network equipments/functions/configurations for specific services and/or specific clients/users and/or specific terminals. The invention aims more particularly at allowing a terminal to be configured with a variable number of network slices on the basis of the specific capacities of the terminal and/or the prescriptions of the network, while taking into account the user's subscription.

2. PRIOR ART

Some network architectures that are specified and deployed at present are structured into network slices allowing a user terminal, depending on the client's subscription (the terminal may be used by a user other than the client who has subscribed to a subscription; the term user or client will be used indiscriminately hereinafter for simplification), to benefit from routing, processing and administration functions adapted to one or more criteria from among type of client, type of terminal, type of application, type of access, etc. Each slice thus makes it possible to offer a quality of service and security level in accordance with one or more of the criteria cited above. It should also be noted that clients and terminals are becoming more and more diversified (IoT (Internet of Things) terminals, smartphones, robots, home gateways, variety of what are known as communicating equipments, etc.), on the one hand, and have quite different capacities and needs, on the other hand. This evolution is also being accompanied by a capacity of at least some of these terminals to be able to simultaneously access a plurality of applications whose data may be routed on distinct network slices. It should be noted that these evolutions target both fixed networks and mobile networks and that the specifications of what are known as fifth generation (5G) networks incorporate this structuring into network slices. According to current techniques, a terminal locally stores the slice identifiers S-NSSAI (Single-Network Slice Selection Assistance Information) of the slices to which the user has subscribed (Configured NSSAI containing the subscribed-to S-NSSAIs) and then, among these, those with which the network authorizes said user to register (Allowed NSSAI containing all or some of the subscribed-to S-NSSAIs) as well as possibly the slice identifiers of slices that are forbidden for said user (Rejected NSSAI). Thus, according to the specifications of 5G networks, to which particular reference will be made in the remainder of this description, a terminal obtains, from the network, and locally stores the identified authorized slice identifiers "Allowed NSSAI (Network Slice Selection Assistance Information)" and, where applicable, the rejected slice identifiers "Rejected NSSAI" determined by the network from among the slice identifiers requested by a user terminal during registration thereof with the network.

A terminal also stores the slices subscribed to in a "Configured NSSAI" parameter that the network may transmit thereto in response to a registration request or by using the UE Configuration Update procedure.

An equipment of the network stores the context of the user terminal "UE context" for this terminal with, inter alia, the information in relation to the authorized slice identifiers (Allowed NSSAI).

The 3GPP specifications, in particular documents TS 23.501 v17.0.0, TS 23.502 v17.0.0, TS 24.501 v17.2.1 (March 2021), make provision for the number of slices registered simultaneously for a given user terminal for a given type of access to be able to be limited, thus impacting the number of slices that a terminal is able to use simultaneously, the terminal being authorized to use a slice only if it has been registered beforehand.

Thus, according to current techniques, a terminal is able to simultaneously register only 8 distinct slice identifiers for a given type of access. The terminal is thus authorized to request only at most 8 slice identifiers in a registration request transmitted to an equipment of a communication network.

However, this network slice management raises issues of scalability. On the one hand, the limit on the number of slice identifiers in the specifications, namely 8 per type of access (3GPP and non-3GPP) in the current specifications, does not take into account the diversity of possible situations and in particular the growing need for the number of slices per terminal. Communication networks may thus comprise a multitude of network slices, and it is possible that terminals have to have access to a greater number of network slices. The capacities of terminals are quite different, as indicated above, and it is possible in particular for terminals to be able to store a greater number of slice identifiers. Some users will want to access a greater number of services, and if the data from these services are routed on different slices, the limit of 8 slice identifiers per access may represent a barrier to accessing these services. At present, the specifications comprise 8 slice identifiers, but the management, in a communication network, of a plurality of applications with different needs, for example in terms of quality of service or security, may require a greater number of slices in order to offer more services to the user while at the same time seeking to optimize procedures in the network of the operator.

The present invention aims to provide improvements with respect to the prior art.

3. SUMMARY OF THE INVENTION

The invention aims to improve the situation by way of a method for parameterizing a terminal device, able to transmit and receive data on a communications network organized into network slices, the method being implemented by a network administration entity able to communicate with the terminal device via the network, and comprising, following receipt of a registration request or a data session establishment request from the terminal device,
- obtaining at least one slice identifier associated with said terminal device,
- determining a maximum number of slices accessible to said terminal device,
- if the determined maximum number of slices is lower than the number of identifiers obtained, transmitting a response message to said received request to the terminal device, said response message indicating rejection of the request and/or a list of identifiers from among the obtained slice identifiers.

According to the prior art, the number of network slices that a terminal device is able to use is set, regardless of the characteristics of the device, such as its memory or storage capacities, the type of subscription of its user or a limit of the contexts established by the device on the communication network to which the device is attached. The parameterization method makes it possible to adapt the number of slices able to be configured and used by a device on the basis of various characteristics. The novel and inventive method thus makes it possible to vary the number of slices authorized/rejected for a given terminal on the basis of various parameters. The method therefore makes it possible to implement a parameterization or even to refuse a registration request or a session establishment request on the basis of a dynamic determination established by an administration entity such as an AMF device upon receipt of a registration message or such as an AMF or SMF device when establishing a session (for example PDU session activation). The parameterization of the terminal device may take into account the intrinsic characteristics of the device, subscription data, but also communication network parameters relating to the device under consideration or more global parameters related to the operator's policy as well as criteria related to the situation of the terminal when it transmits its registration request or its data session activation request. The method thus makes it possible to be able to adapt the number of configured network slices and therefore, by extension, the number of simultaneous sessions to network slices on the basis of characteristics of the terminal devices and of the communication network. The method may possibly inform the terminal device about the number of slice identifiers that it is actually able to configure both in the registration procedure and in the session establishment, in the knowledge that, in the latter case, forbiddance to use the network slice that it may have requested in the session establishment message may be communicated thereto. This information may be exploited by the terminal device so as to optimize, enrich or else limit its connectivity to the communication network.

According to one aspect of the invention, in the parameterization method, the maximum number of slices accessible to said terminal device is determined on the basis of one or more of the following characteristics:
- a storage capacity of the terminal device
- a subscription datum of the user of the terminal device
- a maximum capacity of contexts associated with the terminal device in the network.

The parameterization method may advantageously take into account one or more parameters, including the storage capacity of the terminal device, thus making it possible to differentiate between terminals having highly different storage characteristics, for example between an IoT terminal and a home gateway. A subscription datum, corresponding for example to the type of subscription of the client who owns the terminal device, may also be taken into account along with a datum corresponding to an application or a type of application (for example URLLC (Ultra-Reliable Low Latency Communications) or eMBB (enhanced Mobile Broadband)). For example, it is possible, in the subscribed-to slice format, to distinguish between a slice subscribed to for a client on the consumer market or a business client by using the same type of slice (for example eMBB) but a different service descriptor (the subscribed-to slice format may contain these 2 parameters: slice type SST and service descriptor SD). A capacity in terms of the number of contexts established for a terminal device allowing it for example to route data from various applications having different quality of service or security characteristics may also advantageously be considered. Examples of contexts for a user terminal are the registration context and the data session establishment context. The registration context is created in the registration procedure and stored in AMF; the data session establishment context is created in the PDU session activation procedure and stored in SMF and in AMF (in the UE context that contains in particular, for each PDU session, the PDU session identifier and the slice identifier of the slice in which the session is established).

According to another aspect of the invention, in the parameterization method, determining a maximum number of slice identifiers comprises transmitting, to the terminal device, a request message requesting a storage value and receiving, from the terminal device, a response message comprising said value.

Determining the storage parameter advantageously takes advantage of an exchange of messages between the terminal device and the administration entity. These messages, for example of UE Configuration Update type, allow the administration entity to dynamically ascertain the capacities of a terminal device, these possibly varying over time (for example on the basis of usage and downloaded data, as well as for example updates to the configuration of the terminal device).

According to another aspect of the invention, in the parameterization method, determining a maximum number of slice identifiers relates to the type of terminal device transmitting the registration request or the data session establishment request and/or to the content of said request.

In the parameterization method, determining a maximum number of slice identifiers relates to the type of the terminal device and/or to the access network to which the terminal device is attached at the time of transmission of the registration request or the data session establishment request.

Quite varied devices are likely to attach to the communication network and transmit data on the various slices of this network. The operator of the communication network may therefore set maximum values of slices on the basis of these various types of devices, depending on whether they are smartphones, IoT devices, home gateways, devices for commercial services, etc. The administration entity may thus for example determine the type of device on the basis of an IMEI identifier, an IP address used by the terminal device, or on the basis of a service identifier according to the criterion used from among those mentioned above. Information relating to the access network to which the terminal device is attached may also be used. For example, information indicating that the device is connected to a fixed access type or a mobile access type with a particular access technology, that the device is attached to a visited network in a roaming situation using for example the PLMN ID (Public Land Mobile Network Identifier) parameter or RAT (Radio Access Technologies) access information may be used to determine the maximum number of identifiers. The operator of the communication network may also set maximum values of slices on the basis of the type of client and for example allow registration of a larger number of slices for a business client than for a consumer client.

The operator of the communication network may also set maximum values of slices accessible to the terminal on the basis of the type of slice, for example 3 slices of eMBB type and one slice of URLLC type.

According to another aspect of the invention, in the parameterization method, the registration request or the data session establishment request comprises at least one slice identifier.

According to one example, a terminal device may transmit data on a network slice only if this slice is registered beforehand for the terminal device by the administration entity. The parameterization method, which allows the administration entity to limit the network slices accessible to a terminal, if it is implemented when the device registers, prevents said device from attempting to establish a connection to a greater number of slices than it is allowed and consuming resources of the communication network. The method furthermore makes it possible, where applicable, to tell the terminal device that the session establishment has been rejected if the slice identifier requested in this establishment request leads to exceedance of the number of slices authorized for this terminal device via this request.

According to another aspect of the invention, in the parameterization method, the at least one slice identifier associated with said terminal device is obtained by determining at least one authorized identifier from among at least one subscribed-to slice identifier.

In any case, including in the case where no identifier is received in the request, the administration entity may obtain the slice identifiers of slices specific to the subscription of the client/user who owns the terminal from a third-party entity managing for example the client profiles and the associated capacities.

The administration entity, for example of AMF type, is able to determine the slices authorized/not authorized for registration from among all of the slices subscribed to. The administration entity is also able to determine the slices authorized/not authorized for registration from among the slices received in the registration request and slices registered beforehand during one or more previous registration procedures for the same type of access and registration area.

These examples are non-limiting, and the parameterization method is valid regardless of the method used by the administration entity to determine the slices authorized/not authorized for registration.

According to another aspect of the invention, in the parameterization method, when the received request comprises one or more slice identifiers, the at least one authorized identifier is determined from among at least one identifier contained in the registration request or the data session establishment request.

The administration entity, for example of AMF type, is able to determine the slices authorized/not authorized for registration from among the slices received in the registration request and taking into account the slices subscribed to, the received request comprising all or some of the slices subscribed to.

According to another aspect of the invention, in the parameterization method, if the response message to said received request comprises a list of slice identifiers, this list is determined on the basis of a priority criterion associated with said identifiers.

If the administration entity returns a list of identifiers to the terminal device, it may select these identifiers on the basis of one or more priority criteria, for example, for its response to a registration request. The operator managing the administration entity may thus organize and allocate resources to the network slices in accordance with the priorities associated with the slices. The priority order may be defined for example on the basis of the last identifiers requested by the terminal device, on the basis of data sessions active on a slice, on the basis of the type of slice, or on a combination of these characteristics.

According to another aspect of the invention, in the parameterization method, the response message to said received request furthermore comprises the determined maximum number.

The administration entity may advantageously transmit a response message to the terminal device comprising the maximum number of network slices that said terminal device is able to access, for example in the event of rejection of its data session activation request. The user may thus change terminal device in order to be able to benefit from more slices, or else the user may subscribe to an offer allowing access to more slices, or else the terminal device may update its configuration so as to limit the number of session establishment requests to the received number.

According to another aspect of the invention, in the parameterization method, when the request is a data session establishment request and when it comprises a slice identifier, obtaining at least one slice identifier associated with said terminal device furthermore comprises obtaining a number of active sessions associated with said terminal device, and determining the maximum number of slices accessible to said terminal device furthermore comprises determining a maximum number of sessions.

The parameterization method may advantageously comprise determining a maximum number of sessions, per network slice or for a set of network slices, so as to be able to limit, in the network, an excessive number of active sessions, in addition to or as a replacement for controlling the number of slices accessible to the terminal device, which is for example determined during registration.

According to another aspect of the invention, in the parameterization method, determining the maximum number of sessions relates to the slice identifier received in the request.

The parameterization method may advantageously comprise determining a maximum number of sessions per network slice, so as to be able to limit, in the network, an excessive number of active sessions for a given network slice whose identifier is contained in the session establishment request, in addition to or as a replacement for controlling the number of slices accessible to the terminal device.

According to another aspect of the invention, in the parameterization method, determining the maximum number of sessions relates to all of the slices subscribed to for the terminal.

The parameterization method may advantageously comprise determining a maximum number of sessions, for a set of network slices subscribed to for the terminal, so as to be able to limit, in the network, an excessive number of active sessions for a set of slices.

According to another aspect of the invention, the parameterization method furthermore comprises a step of comparing a maximum number of slices accessible to said terminal device with a number of slices subscribed to for said terminal and, if the number of slices subscribed to is greater than the maximum number of accessible slices, the response message comprises a parameter indicating this exceedance and/or the number of slices subscribed to.

The method may advantageously comprise comparing the number of slices accessible to the terminal, for example on the basis of its capacity, and the number of slices actually subscribed to by the client or the user of the terminal and, if the number of slices subscribed to is greater, it may be beneficial to inform the user/client about this so that they adapt their subscription or else change terminal to one better adapted to the number of slices subscribed to.

The various aspects of the parameterization method that have just been described may be implemented independently of one another or in combination with one another.

The invention also relates to a management method, implemented by a terminal device able to transmit and receive data on a communications network organized into network slices and able to communicate with the network administration entity via the network, and comprising, following transmission of a registration request or a data session establishment request to the administration entity, if a maximum number of slices determined by the administration entity is lower than a number of identifiers obtained, receiving a response message to said received request from the administration entity, said response message indicating rejection of the request and/or a list of identifiers from among the obtained slice identifiers.

According to another aspect of the invention, in the management method, the terminal device furthermore transmits a slice identifier storage maximum value to the administration entity.

According to another aspect of the invention, in the management method, the terminal device, if it receives a response message indicating rejection following the transmission of a session establishment request, terminates at least one active session, and furthermore transmits to the administration entity a new data session establishment request comprising an identifier of the requested slice.

The various aspects of the management method that have just been described are able to be implemented independently of one another or in combination with one another.

The invention also relates to a parameterization device for parameterizing a terminal device, said parameterization device being able to transmit and receive data on a communications network organized into network slices, the parameterization device being implemented by a network administration entity able to communicate with the terminal device via the network, and comprising:
- a receiver able to receive a registration request or a data session establishment request from the terminal device,
- an obtaining module, able to obtain slice identifiers associated with said terminal device,
- a determination module, able to determine a maximum number of slices accessible to said terminal device and to compare the maximum number with the obtained identifiers,
- a transmitter, if the determined maximum number of slices is lower than the number of identifiers obtained, able to transmit a response message to said received request to the terminal device, said response message indicating rejection of the request and/or a list of identifiers from among the obtained slice identifiers.

This device, which is able, in all of its embodiments, to implement the parameterization method that has just been described, is intended to be implemented in an administration entity of a communications infrastructure, such as for example an AMF or SMF equipment, and may be instantiated in a virtualized infrastructure.

The invention also relates to a management device, implemented by a terminal device able to transmit and receive data on a communications network organized into network slices, said management device being able to communicate with a network administration entity via the network, and comprising:
- a transmitter, able to transmit a registration request or a data session establishment request to the administration entity,
- a receiver, able to receive, from the administration entity, if a maximum number of slices determined by the administration entity is lower than a number of identifiers obtained, a response message to said transmitted request, said response message indicating rejection of the request and/or a list of slice identifiers from among the obtained identifiers.

This device, which is able, in all of its embodiments, to implement the management method that has just been described, is intended to be implemented in a terminal, able to attach to a fixed or mobile network, such as a smartphone or a home access gateway etc. This terminal incorporates the user terminal (user equipment specified by the 3GPP) and may correspond for example to an IoT (Internet of Things) terminal, a smartphone, a robot, what is known as a communicating equipment, a home gateway, accessing the network via any type of fixed or mobile access specified by the 3GPP or not, the network possibly corresponding to a public network known as a PLMN or a non-public network known as an NPN (Non-Public Network, in particular an autonomous non-public network known as an SNPN (Stand-alone Non-Public Network)).

The invention also relates to a system for parameterizing a terminal device, able to transmit and receive data on a communications network organized into network slices, said system comprising
- a terminal device including a management device
- an administration entity including a parameterization device.

The invention also relates to a computer program comprising instructions for implementing the steps of the parameterization method that has just been described when this program is executed by a processor and to a recording medium able to be read by a parameterization device and on which the computer program is recorded.

The invention also relates to a computer program comprising instructions for implementing the steps of the management method that has just been described when this program is executed by a processor and to a recording medium able to be read by a management device and on which the computer program is recorded.

These programs may use any programming language and be in the form of source code, object code or intermediate code between source code and object code, such as in a partially compiled form, or in any other desirable form.

The invention also targets a computer-readable information medium comprising instructions of the computer programs as mentioned above.

The information medium may be any entity or device capable of storing the programs. For example, the medium may comprise a storage means, such as a ROM, for example a CD-ROM or a microelectronic circuit ROM, or else a magnetic recording means, for example on a hard disk.

Moreover, the information medium may be a transmissible medium such as an electrical or optical signal, which may be routed via an electrical or optical cable, by radio or by other means. The programs according to the invention may in particular be downloaded from an Internet network.

Alternatively, the information medium may be an integrated circuit in which the programs are incorporated, the circuit being designed to execute or to be used in the execution of the methods in question.

4. BRIEF DESCRIPTION OF THE DRAWINGS

Other features and advantages of the invention will become more clearly apparent on reading the following description of particular embodiments, which are given by way of simple illustrative and non-limiting examples, and the appended drawings, in which.

5. DESCRIPTION OF THE EMBODIMENTS

In the remainder of the description, embodiments of the invention are presented in a communication infrastructure. This infrastructure may be implemented in order to route communications data to fixed or mobile terminals, and the invention may be implemented in a virtualized architecture, the infrastructure being able to be used for routing and/or processing home customer and/or business data.

Figure 1:
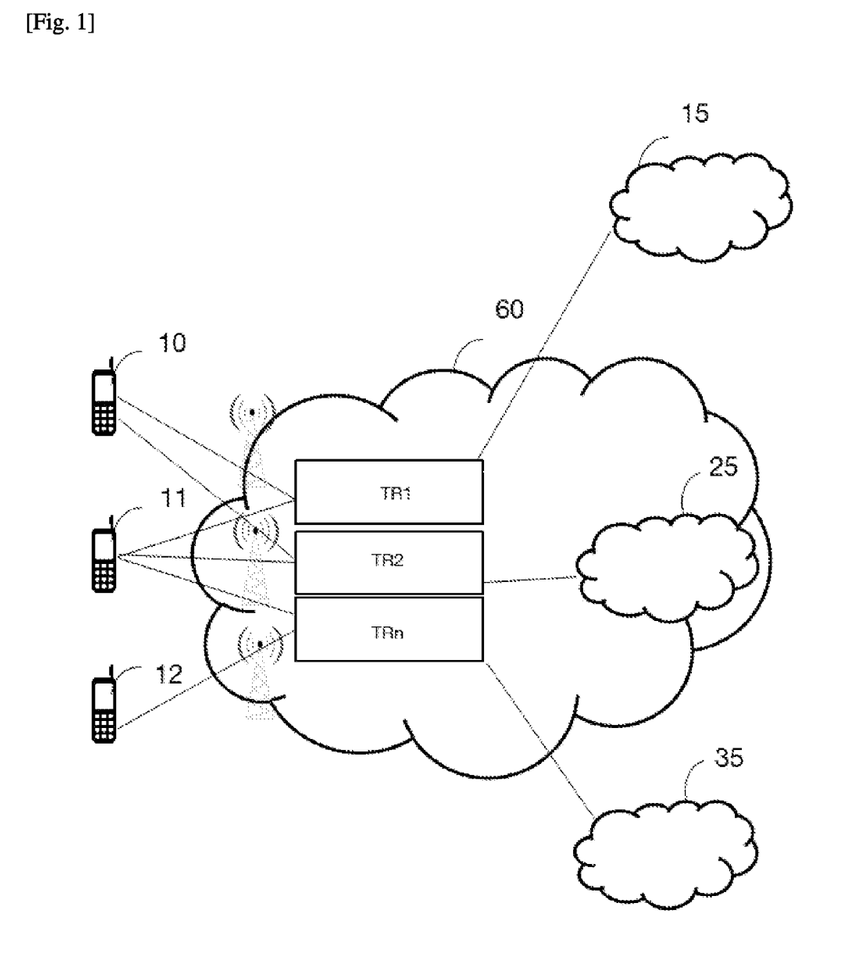
FIG. 1 shows a communications architecture in which the parameterization method and the management method are implemented, according to one aspect of the invention.

Reference is made first of all to [FIG. 1], which shows a communications architecture in which the parameterization method is implemented, according to one aspect of the invention. Three terminals 10, 11, 12 are connected to a communications network 60. These three terminals 10, 11, 12 communicate with one another via the network 60 or with servers installed in data centers 15, 25, 35 installed in the communications network 60 or in networks distinct from the communications network 60.

The three terminals 10, 11, 12 are fixed or mobile terminals. The terminal 10 is for example an IoT (Internet of Things) communication terminal, the terminal 11 is an access terminal of a local area network, also called a home gateway or box, and the terminal 12 is a smartphone terminal. These three terminals 10, 11, 12 communicate using the resources of the communications network 60, and more precisely the resources of the slices TR1, TR2 and TRn of the communications network 60. The slices TR1, TR2, TRn are implemented in the communications network 60 and are based on hardware and/or software resources that ensure capacities and performance in terms of routing data adapted to the data streams of the applications activated on the terminals 10, 11, 12. Thus, for example, the slice TR1 is adapted to real-time data streams, the slice TR2 is adapted to video data streams that are less critical in terms of latency, etc. According to the prior art, the terminals 10, 11, 12 are allocated at most 8 slice identifiers for access to the communications network 60. However, it is possible that a terminal attached to the communications network 60 needs a different number of network slices. An IoT (Internet of Things) terminal could have a maximum number of slices lower than 8, while a box could be parameterized with a number of slices greater than 8 slices. It is useful to provide a terminal parameterization that may be different, for example according to the type of terminal. It may thus be the case that a terminal needs to use the resources of more than 8 slices for its applications (subscription to services or applications requiring more than 8 slices). For example, the terminal 11 communicates with servers using the resources of the slices TR1, TR2, TRn, which may be greater than 8. On the other hand, the terminal 10 will have to be limited to a smaller number of slices, for example to just the slices TR1 and TR2, owing to its storage capacity and/or its subscription data. The parameterization method and the management method thus make it possible to adapt the configuration of the terminal to intrinsic or subscription-related needs and characteristics, in the knowledge that it is also possible to adapt the number of data sessions (for example PDU sessions in 5G) established for a terminal for a slice or a set of slices. The terminal 10 may thus also be dynamically configured so that it does not establish more than 6 simultaneous PDU sessions on the 2 slices TR1 and TR2 and/or so that it does not establish more than 2 simultaneous PDU sessions on the slice TR1, for example. The number of slices accessible to a given terminal may be linked to the type of terminal, according to one alternative. The terminal 10 may thus be restricted to access to 2 slices TR1 and TR2 because it is an IoT terminal.

The maximum number of slices determined during registration may be different from the maximum number of slices determined during data session activation. The terminal may thus be registered for example simultaneously on 8 slices out of the 10 slices subscribed to, but is able to activate data sessions simultaneously only on 3 slices and/or be limited to a total number of sessions or a specific number of sessions, each of which may be different for each slice.

In one particular case in which a data session comprises a slice identifier and the determined maximum number of slices authorized for a terminal is one slice, the method may consist in prioritizing the number of sessions for the slice under consideration and not the number of authorized slices, which is limited to the slice requested in the data session establishment request.

The parameterization method may consist in limiting the number of authorized slices and also in limiting the number of sessions for a slice or for a set of slices subscribed to.

For example, if the administration entity receives a registration request for 5 slices including a URLLC slice and determines a maximum number of 4 slices, then it may determine that the URLLC slice has priority over other types of slices to be registered: if the 5 slices are authorized, then one of the other 4 will be rejected in the response to the terminal.

According to another example for a maximum number of 4 slices, if 3 slices TR1, TR2, TR3 are already registered by way of a previous registration procedure and the network equipment receives a new registration request (for the same type of access and same registration area) for 2 new slices TR4 and TR5 distinct from the first three slices, it may determine that the last two requested slices have priority, and therefore prioritize their registration as soon as they are authorized: assuming cumulative registration, the last two requested slices TR4 and TR5 will be present among the authorized slices in the response to the terminal, while one of the first three slices (TR3) will be among the rejected slices in this response. According to this same example, the rejected slice may be chosen as a priority from among the first three slices (TR1, TR2, TR3) that do not have an active data session, in order to avoid interrupting data sessions given the inability to register these slices (in the example where a slice is able to be used only if it is registered beforehand, and otherwise, the administration entity interrupts any ongoing data sessions; if the terminal has one or more ongoing sessions for a slice, it must request this slice again in a new registration for other slices).

According to one alternative to the previous example, assuming active sessions on the slices TR1 and TR2 and the same assumptions of a limit to 4 slices and cumulative registration, the 5 slices being authorized, then the network equipment may prioritize the slices having active sessions and then the most recently requested slices: the response to the terminal will contain the slices TR1, TR2, TR4, TR5 as authorized slices and the slice TR3 as a rejected slice.

Figure 2:
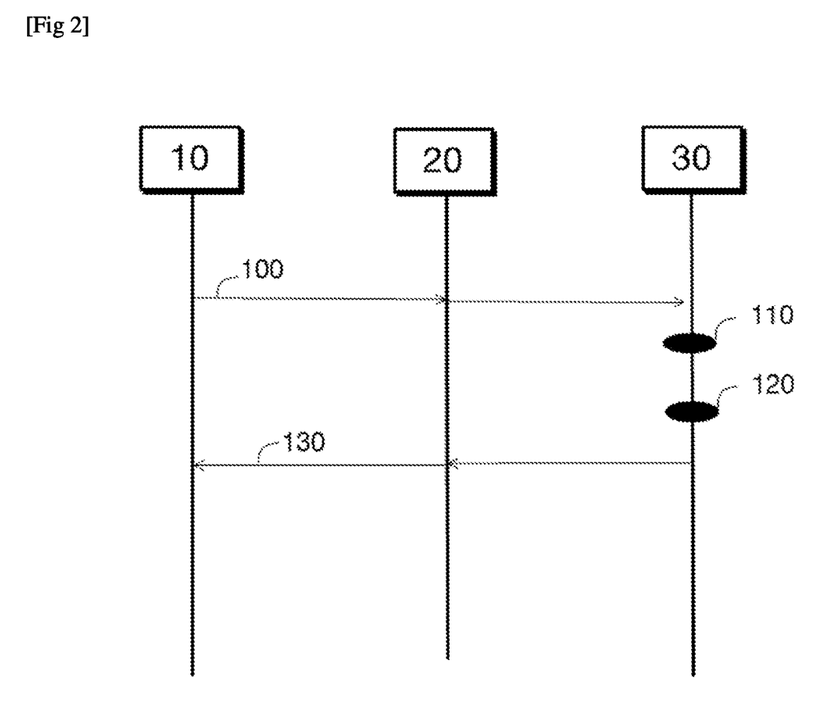
FIG. 2 shows an overview of the method for parameterizing a terminal device and of the management method according to one aspect of the invention.

Reference is next made to [FIG. 2], showing an overview of the method for parameterizing a terminal device according to one aspect of the invention. In this embodiment, a terminal device 10 registers with a management equipment 30 such as an AMF (Access and Mobility Function) equipment of a network via an access node 20, which may be an access node of a wired or wireless network, in a step 100. The registration phase, shown in the form of a request-response in this [FIG. 2] as well as in [FIG. 3], is a simplified view of a user equipment registration, for example described in the 3GPP document TS 23.502 version 17.0.0 of March 2021 or according to other terminal device registration techniques.

The format of the registration request transmitted in step 100 comprises zero or one or more slice identifiers such as an S-NSSAI (Single-Network Slice Selection Assistance Information) identifier.

In a step 110, the administration entity 30 obtains a list of slice identifiers associated with said terminal device 10. According to one alternative, the list of identifiers is obtained by determining, from among the one or more identifiers contained in the registration request received from the terminal device 10 in step 100, that/those that the administration entity authorizes for registration. According to another alternative, this list of identifiers is obtained by determining, from among the one or more subscribed-to slice identifiers, that/those that the administration entity authorizes for registration without taking into account any identifier possibly present in the registration request. The slice identifiers of slices to which the user/client of the device 10 has subscribed are stored in the administration entity 30 or in a storage entity (for example a UDR (Unified Data Repository) or UDM (Unified Data Management) subscription database in 5G), not shown in [FIG. 2] and able to communicate with the administration entity 30. According to yet another alternative, this list of identifiers is obtained by determining, from among the one or more identifiers received in the registration request and in addition to the identifiers stored in the administration entity 30 or the storage entity, that/those that the administration entity 30 authorizes for registration (what is referred to as cumulative registration in this document).

In a step 120, the administration entity 30 determines a maximum number of network slices accessible to the terminal device 100. This maximum number of slices may be determined in various ways. This limit may depend on the storage capacity of the terminal device 10. According to one alternative, the storage capacity of the terminal device may be obtained by sending a request message requesting a storage value to the terminal device 10 and, in response to this request message, the terminal device 10 sends a storage value, thus informing the management equipment 30 about a maximum number of slices that the terminal device 10 is able to configure. For example, this may be the case in a procedure for updating the configuration of the terminal device 10 prior to registration, this procedure taking place during subscription and in each configuration update. For example, this procedure may take place as follows:

The administration entity 30 sends the UE Configuration Update Command (not shown in [FIG. 2]) while requesting a response from the terminal device 10, for example by inserting a "Configuration Update indication" parameter with a value corresponding to an acknowledgement request, or advantageously with a new parameter to request the maximum number of slices supported by the terminal device 10, this new parameter possibly being for example "acknowledgement requested with limit storage number" information.

The terminal device 10 sends the UE Configuration Update Complete response (not shown in [FIG. 2]), and this response may contain the storage limit information in relation to the Allowed NSSAI, Rejected NSSAI parameters (or even other parameters such as the Pending NSSAI parameter for slices requiring authentication before being authorized), that is to say a common limit for all of the parameters and/or a limit for each parameter. For reasons of simplicity, a single limit on the Allowed NSSAI parameter or a common limit at least for the Allowed NSSAI, Rejected NSSAI parameters, represented for example by the "UE SNSSAI storage limit" parameter, is proposed here. The Configuration Update Complete message thus comprises an optional "UE SNSSAI storage limit" parameter in the form of an integer indicating the limit number of slices that the terminal device 10 is able to store.

According to another alternative, the terminal device 10 may also include this storage limit in the message in the registration request transmitted in step 100.

The limit on a maximum number of network slices accessible to the terminal device 10 may also depend on a subscription datum of the user of the terminal device 10. According to one example, the limit is thus stored in the subscription information of the terminal device 10, and the administration entity 30 becomes aware of it in the registration procedure.

According to another alternative, the maximum number of slices may be determined on the basis of a maximum capacity of contexts associated with the terminal device 10 in the network, typically an average capacity per terminal, or a capacity per terminal established according to one or more criteria according to the policy of the operator.

The administration entity 30 may store a limit on the number of slices that it is able to register per terminal device, typically in the form of a parameter dedicated to the format of an integer, in various ways, for example:

Option #1: Local Configuration at the Administration Entity 30

The operator locally configures this limit in the management entities (AMF) of its network.

Option #2: Configuration Among Structured Data or Unstructured Data

The operator configures this limit in the UDR (Unified Data Repository) database (respectively UDSF (Unstructured Data Storage Function)) for data whose format is defined for example by the 3GPP organization.

In the registration procedure, the administration entity 30 may retrieve this information through exchanges, for example via a PCF (Policy Control Function), not shown in [FIG. 2].

Option #3: Configuration Among the QoS Policy and Charging

The operator configures this limit among the PCC (Policy Control and Charging) policy stored in a PCF. A new parameter is created for this purpose.

In the registration procedure, the administration entity 30 may retrieve this information via the exchanges in the registration procedure, that is to say after having received the registration request from the terminal device 10 in step 100.

The various criteria used as an alternative in the determination step 120 may also be used concurrently between a storage capacity limit of the terminal device 10 and a storage capacity per terminal device 10 in an equipment of the network (AMF, PCF, UDR). The most restrictive criterion in the maximum number of slices is thus decisive in this case. Moreover, the administration entity 30, when it is aware of a limit on the storage capacity of the terminal device 10, is able to detect whether this limit is lower than the number of slices subscribed to (because the subscription data contain the slices subscribed to and the administration entity 30, during registration, obtains the subscription data relating to the registration). Multiple options are considered to inform the terminal device 10 of this error case, so that the user knows that they will not be able, with this terminal device 10, to use all of the slices subscribed to, as described below.

If the number of identifiers obtained in step 110 is greater than the maximum number determined in step 120 according to one of the alternatives described above, the administration entity 30 then transmits, in a step 130, a response message to the received registration request to the terminal device 10 via the access node 20. This message indicates rejection of the request and/or a list of identifiers from among the obtained slice identifiers of slices that the terminal device 10 is or is not actually able to access.

The order of steps 110 and 120 may be swapped in another exemplary embodiment. Advantageously, in step 120 or after step 120, the administration entity may furthermore compare the number of slices accessible to the terminal device 10, for example if it has obtained a capacity of the terminal device 10 to register a number of slices, with the number of slices actually subscribed to. If the number of slices subscribed to is greater than the maximum number of slices that the terminal device 10 is able to register, then the administration entity may inform the terminal device 10 of this by sending an error message and/or the number of slices subscribed to, for example in the message transmitted in step 130. Upon receipt of this message, the user may for example change terminal device in order to be able to actually benefit from all of the slices subscribed to and/or change their type of subscription.

If it is determined that all of the slices are rejected, the administration entity 30 rejects the registration request, for example with a REGISTRATION REJECT response. An error code, for example called "number of slices subscribed to greater than storage capacity", is possibly contained in the response message sent in step 130 in the case where the administration entity 30 has detected for example that the storage capacity of the terminal 10 is lower than the number of slices subscribed to by the user of the terminal 10. If the administration entity 30 accepts the registration for one or more slices, the administration entity 30 adds information to the acceptance response, for example of REGISTRATION ACCEPT type, to the terminal device 10, optionally with a new specific value in the optional Boolean "5GS registration result" parameter whose value at 1 would indicate that the terminal device 10 will not be able to use all of the slices obtained in step 110 owing to its storage limit. An alternative or an addition would be an integer indicating the number of slices subscribed to.

According to one example, the response message transmitted in step 130 comprises a list of identifiers from among the identifiers obtained in step 110, offering the terminal device 10 the possibility of using the network slices whose identifiers are transmitted in the response message as soon as they are authorized.

According to this alternative, the terminal device 10 is constrained by the identifiers transmitted by the administration entity 30.

According to another alternative, the slice identifiers transmitted in the response message are selected by the administration entity 30 in accordance with a priority order specific to the administration entity 30.

The administration entity 30 may thus take multiple options, in addition to the type of slice itself, for example the URLLC slice as first priority, as a basis for selecting and prioritizing the identifiers that will be transmitted in the response message, these identifiers corresponding for example to the authorized NSSAIs. For example, the order in which the administration entity selects the identifiers to be transmitted from among the obtained identifiers relates to the last slice identifiers requested by the terminal device 10. The administration entity 30 thus prioritizes the last slices requested by the terminal device 10 (that is to say the value of the Requested NSSAI of the last one or more registration requests). If the registration request comprises one or more identifiers, the administration entity 30 selects one or more identifiers to be transmitted that were actually requested by the terminal 10 in the registration request.

According to a second option, the priority order is based on the slices having one or more active PDU (Protocol Data Unit) sessions. The administration entity 30 selects as a priority the slice identifiers of slices for which there are already one or more active PDU sessions for the terminal device 10: this makes it possible to handle an error case (where the terminal device 10 does not request registration of these slices again) and to avoid the end of registration of these slices and therefore the deletion of the PDU sessions for these slices.

The administration entity 30 is able to detect whether PDU sessions are active for a slice since the context of the terminal device 10 stored in the administration entity 30 contains a "PDU Session level context" part containing the associated one or more S-NSSAIs (used as slice identifier) for each active PDU session.

According to a third option, the priority order is defined on the basis of the slices with active PDU sessions, and then on the last slices requested by the terminal device 10. This third option is a combination of the previous options.

The priority rule is used mainly if the operator cannot register all of the slices in the registration procedure, that is to say the number of authorized and/or rejected slices being limited.

Figure 3:
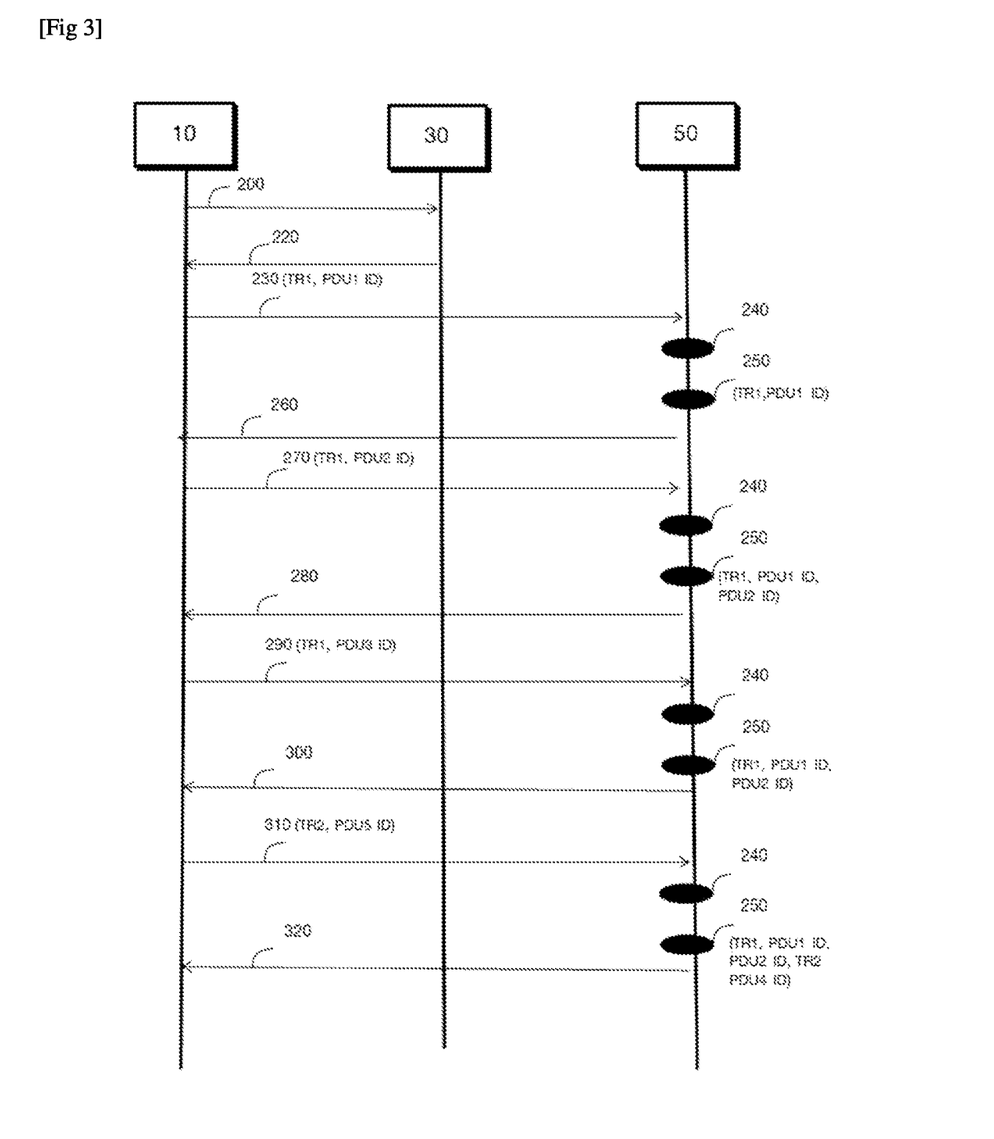
FIG. 3 shows an overview of the method for parameterizing a terminal device and of the management method according to another aspect of the invention.

FIG. 3 shows an overview of the method for parameterizing a terminal device according to another aspect of the invention.

In steps 200 and 220, the terminal device 10 (also called UE (User Equipment)) registers with an administration entity 30 (also called AMF or MME (Mobility Management Entity)). This registration of the UE 10 with the AMF entity 30, via a radio access station (not shown), may be implemented in accordance with what is described in the 3GPP document TS 23.502, or may be carried out using the parameterization method as described in [FIG. 2]. The parameterization method may indeed be performed in the registration procedure, as described in [FIG. 2], and/or in a session establishment procedure as described below.

In a step 230, the UE (terminal device) 10 transmits a session establishment request to an SMF (Session Management Function) entity 50 via the AMF 30. The administration entity implementing the parameterization method in the session activation may be the AMF entity 30 (as stated above, AMF knows the PDU Session level context for each PDU session of the UE 10) or the SMF entity 50. According to this example, the administration entity is the SMF entity 50. It should be noted that the session establishment procedure is simplified here compared with session establishment according to known techniques in order to focus on the aspects relating to the invention. In step 230, the UE has created the data session establishment message while including a slice identifier in the request. This slice identifier may be selected by the UE 10 on the basis of its configuration and/or of application information, for example. According to one alternative, the data session establishment request comprises multiple slice identifiers.

In a step 240, the SMF entity 50 obtains the slice identifiers associated with the UE 10. These obtained slice identifiers, according to the examples described in [FIG. 2], include the slice identifier present in the data session establishment request as well as the slice identifiers for data sessions established prior to the transmission of the request in step 230, where applicable. Indeed, the SMF creates an "SMF context" for each PDU session of the terminal when the PDU session is activated, and this SM context contains the slice identifier (3GPP TS 23.502).

The SMF entity 50 determines the maximum number of slices accessible to the UE 10 in a step 250. This number of accessible slices may be determined in a manner analogous (using analogous parameters) to the options indicated in the description of [FIG. 2], namely, in summary:

for the limit on the user terminal side:
  by sending in the request, here the session establishment request;
  by sending in a response message to a network request, for example with the UE Configuration Update procedure;
for the limit on the network side:
  by storing a subscription datum for the user terminal that is retrieved by the administration entity, here the SMF, in the session activation procedure;
  by storing a datum according to the policy of the operator, which is stored in the administration entity or retrieved by the administration entity (3 options).

According to one example, when the SMF 50 receives the session establishment request in step 230, it determines whether the number of active sessions for the requested slice or for all of the slices subscribed to has reached the number of slices and possibly the number of sessions to be established, for example in accordance with the two variants described above, that is to say specifically for the network slice whose identifier is received in the session establishment request and/or else independently of the requested slice but while complying with a maximum number of sessions for all of the slices subscribed to for the UE 10. Thus, for example, with a maximum number of sessions relating to each slice, assuming the registration is accepted for the 2 slices TR1 and TR2 subscribed to (in step 220) and for example with an assumption of 2 sessions at most per slice:

The terminal requests the activation of a first session PDU1 ID for the slice TR1, the SMF entity 50 obtains, in step 240, a list of slice identifiers, here the slice TR1, and then determines a maximum number of sessions for the requested slice, here 2, and may therefore accept the session activation request in the knowledge that it has no session for TR1 and no slice in the determination.

Thus, if the number of slice identifiers obtained, comprising the identifier present in the session establishment request, does not reach the limit on a number of slice identifiers of slices on which the UE 10 is able to transmit and receive data determined in step 240, and if all of the mechanisms relating to the establishment of the requested session have actually been validated, the SMF 50 implements the requested session and transmits, in a step 260, an acceptance message to the UE 10 via the AMF equipment for the requested session and for the slice identifier present in the request transmitted in step 230. According to the example described above, the SMF 50 furthermore determined that the maximum number of sessions for the slice TR1 was not reached, and the acceptance message is transmitted if the maximum number of sessions for the slice TR1 is not exceeded. It should be noted that, if the maximum number of slices corresponds to the number of slice identifiers in the session establishment request, the determination consists in determining as a priority whether or not the maximum number of sessions for this slice or these slices is reached. In step 270, the UE 10 requests the activation of a second session PDU2 ID for the slice TR1. In step 240, the SMF 50 obtains a list of slice identifiers, here the slice TR1, and then determines a maximum number of sessions for TR1, here 2, and may therefore accept the session activation request (it has just one session for TR1) in step 280.

The UE 10 may thus establish as many sessions relating to network slices as long as it does not reach a maximum number of slices and possibly a maximum number of sessions for one or more of these slices. According to this example, the UE 10 has established sessions PDU1 ID and PDU2 ID for the slice TR1.

In a step 290, the UE 10 transmits, to the SMF 50, a request to establish a new session PDU3 ID for the slice TR1 to the SMF 50, and this SMF entity 50 determines, in steps 240 and then 250, corresponding to the abovementioned steps, that the maximum number of slices, corresponding to one, is not exceeded but that the number of sessions for this slice TR1 has been reached and that it is no longer able to accept new sessions for this slice TR1. In step 300, it therefore rejects the session establishment request transmitted by the UE 10 in step 290.

According to this alternative, the maximum number of slices accessible to the UE 10 determined in step 250 therefore furthermore comprises information about a maximum number of sessions that the UE 10 is able to activate, and this limit, according to a first variant, may be individual for the UE 10 according to its subscription and/or, according to a second variant, correspond to a value common to all of the UEs according to the policy of the operator.

Thus, according to the first variant, that is to say if the number of authorized sessions is specific to the UE 10, parameters are added to the subscription data for the UE 10. Multiple options may be considered:

an overall limit for the UE 10 for the use of all of the slices subscribed to, making it possible to have a maximum number of sessions for all of the slices subscribed to; and/or
  a limit applicable per slice, which could be identical or different for each slice subscribed to. A maximum number of sessions would thus be registered in the subscription data per network slice as described above for the slice TR1. If the maximum number of slices is equal to 1, for example for the slice TR1, the number of data sessions (2 in the example) is preponderant in the decision of the SMF 50 as to whether or not to accept the establishment of a new session.

In the first case, an additional parameter would be added to the format defining all of the slices subscribed to by the UE from among the subscription data: the NSSAI parameter represents all of the slices subscribed to and contains a collection of slices represented with the defaultSingleNssai and SingleNssai parameters: a parameter would be defined for example by a parameter called nbPDUSessionsMAX attached directly to the NSSAI parameter so as to define a limit number of PDU sessions for the UE for all of the slices subscribed to (optional integer parameter).

Multiple formats may be considered for defining the limit number of PDU sessions per slice for the UE 10 in its subscription data:

in the SnssaiInfo parameter, specified in the 3GPP document TS 29.503, itself contained in the singleNSSAIS or DefaultSingleNssai parameter indicating a slice with for example the addition of a new optional integer parameter called nbPDUSessionsLimit designating the maximum number of simultaneously active PDU sessions for this slice.

or else in the AdditionalSnssaiData SnssaiInfo parameter as specified in the 3GPP document TS 29.503, itself attached to a slice and that would comprise here an additional integer parameter, for example called nbP-DUSessionsLimit, designating the maximum number of simultaneously active PDU sessions for this slice.

Thus, according to another example shown in [FIG. 3], if the maximum number of sessions for the entire subscription corresponds to at most 2 sessions per slice and at most 3 sessions for the subscription (all of the slices subscribed to): It is considered that the UE 10, in steps that are not shown in [FIG. 3], requested the activation of a first session PDU4 ID for the slice TR2, that the SMF entity 50, in step 240, obtained a list of slice identifiers, for example the slices TR1, TR2, and then determined a maximum number of sessions for the requested slice, corresponding to 2 according to the example, and a maximum number for all of the slices (TR1 and TR2), here corresponding to 3, and therefore accepted the session activation request (for the session PDU4 ID on the slice TR2), in the knowledge that it already had 2 accepted sessions for the slice TR1 and that the UE 10 had not reached either the maximum number of sessions for a slice (TR2) or the maximum number for a set of slices subscribed to (TR1 and TR2). If the UE 10, in step 310, requests the activation of a session PDU5 ID for the slice TR2, the SMF entity 50, in step 240, obtains a list of slice identifiers, here the slices TR1, TR2, and then determines a maximum number of sessions for the requested slice, here corresponding to 2, and a maximum number for all of the slices, here corresponding to 3, and therefore, in step 320, refuses the session activation request since it has 2 accepted sessions (PDU1 ID, PDU2 ID) for the slice TR1 and 1 session (PDU4 ID) for the slice TR2. The UE 10, having reached the maximum number of sessions for the slices subscribed to, has the establishment of the new session refused. It should be noted that the SMF entity 50 may consider either the number of slices requested and/or just the number of sessions for a requested slice and/or the number of sessions for the set of slices subscribed to in order to accept or not accept the establishment of a new session.

Thus, in the first case, the SMF 50 obtained the subscription data of the UE 10, and these data contain the limit to be applied.

For the second variant, the SMF 50 may obtain the limit, that is to say the maximum number of sessions, according to multiple options as indicated below.

The SMF administration entity 50, or a storage entity communicating with the SMF 50, may store a limit on the number of slices that it is able to accept for the UE 10, typically in the form of a parameter dedicated to the format of an integer, in various ways, for example:

Option #1: Local Configuration at the SMF 50

The operator locally configures this limit in the SMFs 50 of its network.

Option #2: Configuration Among Structured Data or Unstructured Data

The operator configures this limit in the UDR (respectively UDSF) database considered to be the storage entity for data whose format is defined (respectively not defined) by the 3GPP organization.

In the PDU session activation procedure, the SMF 50 may retrieve this information via exchanges via the PCF in the PDU session activation procedure.

Option #3: Configuration Among the QoS Policy and Charging

The operator of the communication network configures this limit in the PCF (considered to be the storage entity). A new parameter is created for this purpose. In the PDU session activation procedure, the SMF 50 may retrieve this information in the PDU session activation procedure.

If the number of slices is reached, the SMF 50 transmits a response message to the session establishment request to the UE 10, this response message indicating rejection of the request. As an alternative, this rejection comprises specific error information indicating that the slice quota and possibly the session quota has been reached. One type of error may be specific to the case where the number of slices is reached, and another type of error if the maximum number of sessions is reached. The UE 10 might not have reached the maximum number of slices, but the number of sessions may be reached thereby, in which case an error message will be returned in step 310.

The UE 10 may have reached the maximum number of slices, in which case an error message will be transmitted, this message possibly also comprising a type of error if the maximum number of sessions (for the requested slice or for all of the slices subscribed to) is reached.

The UE 10 will have to identify the cause of rejection of the PDU session establishment, which will give rise, according to some alternatives:

either to the maintenance of existing PDU sessions and, in this case, the UE 10 would not request the activation of a PDU session again for the desired new slice;

or to the termination of an active PDU session so as to be able to request the activation of a PDU session for a new slice.

Figure 4:
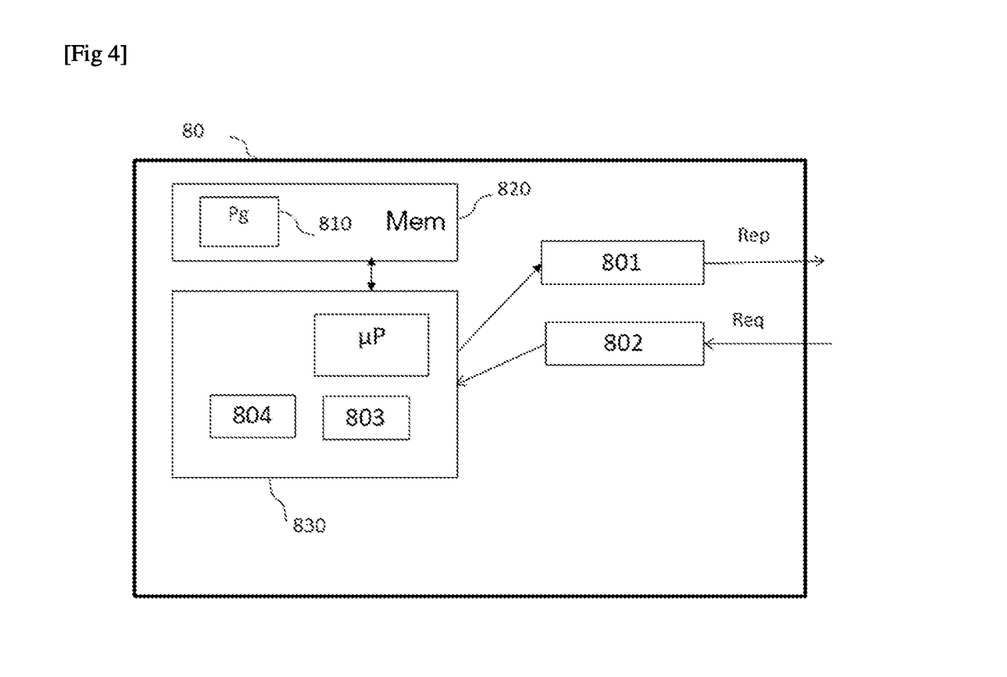
FIG. 4 shows one example of a structure of a parameterization device according to one aspect of the invention.

FIG. 4 shows one example of a structure of a parameterization device.

The parameterization device 80 implements the parameterization method, various embodiments of which have just been described.

Such a device 80 may be implemented in an administration entity of a communications infrastructure, such as for example a virtualized infrastructure, and may for example be instantiated in an AMF or SMF equipment.

For example, the device 80 comprises a processing unit 830, equipped for example with a microprocessor uP, and driven by a computer program 810, stored in a memory 820 and implementing the determination method according to the invention. On initialization, the code instructions of the computer program 810 are for example loaded into a RAM memory, before being executed by the processor of the processing unit 830.

Such a parameterization device 80 comprises:
- a receiver 802 able to receive a registration request or a data session establishment request Req from the terminal device,
- an obtaining module 803, able to obtain slice identifiers associated with said terminal device,
- a determination module 804, able to determine a maximum number of slices accessible to said terminal device and to compare the maximum number with the obtained identifiers,
- a transmitter 801 able, if the determined maximum number of slices is lower than the number of identifiers obtained, to transmit a response message Rep to said received request to the terminal device, said response message indicating rejection of the request and/or a list of identifiers from among the obtained slice identifiers.

Figure 5:
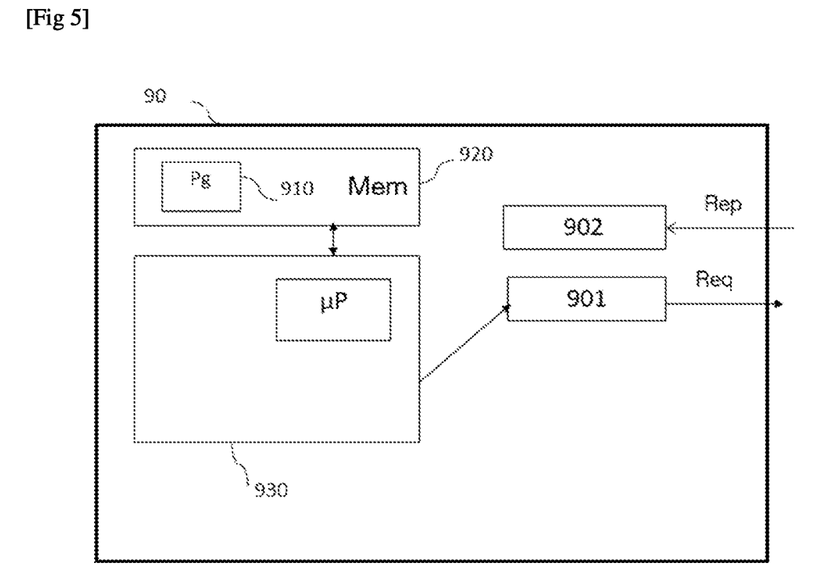
FIG. 5 shows one example of a structure of a management device according to one aspect of the invention.

FIG. 5 shows one example of a structure of a management device.

The device 90 implements the management method, various embodiments of which have just been described.

Such a device 90 may be implemented in a terminal able to attach to a fixed or mobile network, such as a smartphone or a home access gateway.

For example, the device 90 comprises a processing unit 930, equipped for example with a microprocessor uP, and driven by a computer program 910, stored in a memory 920 and implementing the taxation method according to the invention. On initialization, the code instructions of the computer program 910 are for example loaded into a RAM memory, before being executed by the processor of the processing unit 930.

Such a management device 90 comprises:
- a transmitter 901, able to transmit a registration request or a data session establishment request Req to the administration entity,
- a receiver 902, able to receive, from the administration entity, if a maximum number of slices determined by the administration entity is lower than a number of identifiers obtained, a response message Rep to said transmitted request, said response message indicating rejection of the request and/or a list of slice identifiers from among the obtained identifiers.

The invention claimed is:

1. A management method for transmitting and receiving data on a communications network organized into network slices for communicating between a terminal device and a network administration entity via the communication network, the method comprising:
   transmitting, by the terminal device, a registration request or a data session establishment request to the network administration entity, the registration request or the data session establishment request comprising at least one slice identifier; and
   following the transmission of the registration request or the data session establishment request to the network administration entity:
   obtaining, by the network administration entity, at least one slice identifier associated with said terminal device, the at least one slice identifier being obtained by determining at least one authorized identifier, determined from among the at least one identifier contained in the registration request or the data session establishment request, from among at least one subscribed-to slice identifier;
   determining, by the network administration entity, a maximum number of slices accessible to said terminal device; and
   in response to the determined maximum number of slices accessible to the terminal device being lower than a number of the at least one slice identifier associated with the terminal device obtained by the network administration entity, the terminal device receiving a response message from the network administration entity to said transmitted registration request or said data session establishment request, said response message indicating rejection of the request, wherein said response message indicating rejection of the request comprises at least one of: 1) error information indicating that the maximum number of slices accessible to the terminal device has been reached; 2) a number of slices to which the terminal device has subscribed; or 3) a list of identifiers from among the at least one slice identifier obtained from the network administration entity.

2. The management method as claimed in claim 1, wherein the terminal device furthermore transmits a slice identifier storage maximum value to the network administration entity.

3. The management method as claimed in claim 1, comprising the terminal device, in response to receiving the response message indicating rejection following the transmission of the data session establishment request, terminating at least one active session, and furthermore transmitting to the network administration entity a new data session establishment request comprising an identifier of a requested slice.

4. The management method as claimed in claim 1, wherein the maximum number of slices accessible to said terminal device is determined on the basis of:
   a storage capacity of the terminal device;
   and/or a subscription datum of the user of the terminal device;
   and/or a maximum capacity of contexts associated with the terminal device in the network.

5. The management method as claimed in claim 1, further comprising receiving from the network administration entity a request message requesting a slice identifier storage value and transmitting, from the terminal device, a response message comprising said value.

6. The management method as claimed in claim 1, wherein the maximum number of slices relates to a type of the terminal device and/or a content of the registration request or the data session establishment request.

7. The management method as claimed in claim 1, wherein the response message to said transmitted request comprises a list of slice identifiers, and this list is determined on the basis of a priority criterion associated with said identifiers in the list.

8. The management method as claimed in claim 1, wherein the response message to said transmitted request furthermore comprises the determined maximum number.

9. The management method as claimed in claim 1, wherein the method comprises transmitting the data session establishment request, which comprises the at least one slice identifier, wherein obtaining, by the network administration entity, at least one slice identifier associated with said terminal device furthermore comprises obtaining a number of active sessions associated with said terminal device, and wherein determining the maximum number of slices accessible to said terminal device the terminal has a number of active sessions associated with said terminal device, and wherein the maximum number of slices relates to a maximum number of sessions.

10. The management method as claimed in claim 9, wherein the maximum number of sessions relates to the slice identifier transmitted in the data session establishment request.

11. The management method as claimed in claim 9, wherein the maximum number of sessions relates to all of slices of the network slices subscribed to for the terminal.

12. The management method as claimed in claim 1, wherein, in response to the number of slices of the network slices the terminal has subscribed to being greater than the maximum number of slices, the response message comprises a parameter indicating this exceedance and/or the number of slices to which the terminal device has subscribed.

13. A system comprising:
a terminal device for transmitting and receiving data on a communications network organized into network slices to communicate between the terminal device and a network administration entity via the communications network, and comprising:
a receiver;
a transmitter;
at least one first processor; and
at least one first non-transitory computer readable medium comprising instructions stored thereon which when executed by the at least one first processor configure the terminal device to:
use the transmitter to transmit a registration request or a data session establishment request to the network administration entity, the registration request or the data session establishment request comprising at least one slice identifier, and
use the receiver to receive, from the network administration entity, a response message to said transmitted registration request or data session establishment request; and
the network administration entity comprising:
at least one second processor; and
at least one second non-transitory computer readable medium comprising instructions stored thereon which when executed by the at least one second processor configure the network management entity to:
obtain at least one slice identifier associated with said terminal device, the at least one slice identifier being obtained by determining at least one authorized identifier, determined from among the at least one identifier contained in the registration request or the data session establishment request, from among at least one subscribed-to slice identifier;
determining, by the network administration entity, the maximum number of slices accessible to said terminal device; and
transmit, to the terminal device, the response message in response to the determined maximum number of slices accessible to the terminal device being lower than a number of the at least one slice identifier associated with the terminal device obtained by the administration entity, said response message indicating rejection of the request, wherein the response message indicating rejection of the request comprises at least one of: 1) error information indicating that a maximum number of slices accessible to the terminal device has been reached, 2) a number of slices to which the terminal device has subscribed, or 3) a list of slice identifiers from among the at least one slice identifier obtained by the network administration entity.

14. First and second non-transitory computer readable media comprising computer program instructions stored thereon for implementing a management method when the program is executed by processors of a terminal device and a network administration entity, for transmitting and receiving data on a communications network organized into network slices for communicating between the terminal device and the network administration entity via the communications network, the method comprising:
transmitting, by the terminal device, a registration request or a data session establishment request to the network administration entity, the registration request or the data session establishment request comprising at least one slice identifier; and
following the transmission of the registration request or the data session establishment request to the network administration entity:
obtaining, by the network administration entity, at least one slice identifier associated with said terminal device, the at least one slice identifier being obtained by determining at least one authorized identifier, determined from among the at least one identifier contained in the registration request or the data session establishment request from among at least one subscribed-to slice identifier;
determining, by the network administration entity, a maximum number of slices accessible to said terminal device; and
in response to the determined maximum number of slices accessible to the terminal device being lower than a number of the at least one slice identifier associated with the terminal device obtained by the network administration entity, the terminal device receiving a response message from the network administration entity to said transmitted registration request or said data session establishment request, said response message indicating rejection of the request, wherein said response message indicating rejection of the request comprises at least one of: 1) error information indicating that the maximum number of slices accessible to the terminal device has been reached; 2) a number of slices to which the terminal device has subscribed; or 3) a list of identifiers from among the at least one slice identifier obtained from the network administration entity.

* * * * *